Nov. 1, 1932.   D. WORTMANN   1,886,074
STORAGE TANK
Filed Jan. 16, 1931
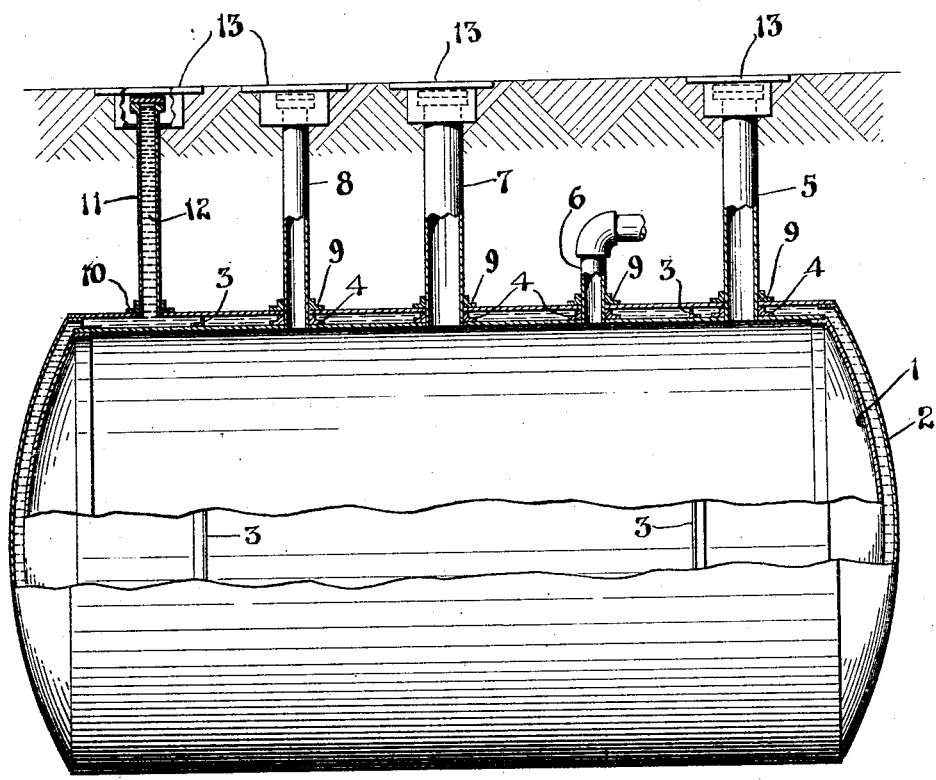
INVENTOR
Dietrich Wortmann
BY
ATTORNEY Patented Nov. 1, 1932

1,886,074

UNITED STATES PATENT OFFICE

DIETRICH WORTMANN, OF BROOKLYN, NEW YORK

STORAGE TANK

Application filed January 16, 1931. Serial No. 509,210.

This invention relates to storage tanks for fluids, such as fuel oil and gasoline, for installation in or adjacent to buildings, such as private homes, apartment houses, factories, automobile service stations, etc., and in localities where such tanks are required to be placed underground.

Tanks for this purpose are commonly made of boiler iron of suitable gauge and usually are required to be enclosed in underground vaults or encased in concrete. It has been found that when leaks occur in such tanks, the occurrence is not readily discovered, even when the fluid stored in the tank has a strong odor, as in the case of gasoline, and such occurrence aside from the actual loss of fluid, may cause considerable damage if not checked promptly.

The object of this invention is to provide a storage tank for such fluids, and to combine therewith an indicating means which will readily indicate a leak in the tank, and which means will function without the employment of mechanical indicators, floats, dials, etc. Indicating means of this type are more or less exposed to injury or subject to interference in operation, or which due to various causes may entirely fail to operate, or which may not function with sufficient promptness to give immediate indication of the occurrence of a leak.

In carrying this invention into effect, I provide a double-walled or jacketed storage tank, the jacket or outer shell being preferably of metal similar to the storage tank proper, and the space between the two shells of the tank when in use is entirely filled with a fluid which serves as the leak detector. For this purpose various fluids, such as oils or specially colored fluids, may be employed so that leaks in both shells of the tank may be readily and quickly discovered upon the slightest leak occurring by noting the drop of the detector fluid in an indicator or detector tube connected with the outer shell of the tank, or by the presence of the detector fluid in the gasoline or other fluid in the storage part of the tank.

My invention is illustrated in the accompanying drawing which is a longitudinal elevation and partial section of a jacketed storage tank, and showing the usual inlet, suction, gauge and vent pipes, fittings and service boxes, and an extra pipe, fitting and service box for the space between the two shells of the tank.

Referring to the drawing, 1 indicates the storage tank and 2 the outer shell or jacket. The inner shell 1 is supported and held spaced within the outer shell 2 in any suitable manner, and for the purpose of illustration, a pair of circumferential flanges 3 are shown on the shell 1. In practice these flanges or other supporting and spacing means will be open or perforated to permit the free flow of fluid in the jacketed space, and which fluid will entirely surround the inner or storage shell. The amount of clearance between the inner and outer shells may be relatively slight, but sufficient to provide the space necessary for an effective quantity of detector fluid, and sufficient space to permit the free flow of fluid, and to afford sufficient clearance for the pipe fittings 4 mounted on the inner shell. The outer shell 2 will be perforated to admit the entrance of the usual inlet or filling pipe 5, vent pipe 6, gauge or measuring pipe 7, and suction or outlet pipe 8. The openings in the outer shell through which these pipes pass will be provided with fittings, packing and packing rings, the details of which form no part of the present invention and therefore are only schematically illustrated as flanged rings 9. The outer shell 2 has an additional opening provided with a fitting 10 to receive pipe 11. This pipe serves as the inlet for the detector fluid 12, and also as an inspection and indicator tube. All of the tubes 5, 7, 8 and 11 lead to service boxes 13 of any approved type and hence are only illustrated schematically. Vent pipe 6 does not lead to a service box and is usually carried up to a suitable point on a building or above ground. Pipes 5, 7, 8 and 11 at the service boxes are closed by suitable plugs or caps as usual. Leak detector pipe 11 is employed to fill the space between shells 1 and 2 with the detector fluid 12 and this fluid will be brought to a definite level in pipe 11 for indicating purpose.

The detector fluid may be any suitable oil or water. When water is employed it will be colored so as to be readily discovered if it escapes from its space between the two shells either to the outside of shell 2 or into shell 1. A fluid with a strong odor readily distinguishable over the contents of tank 1 may be employed as the leak detecting fluid, but in practice I prefer to employ a dark oil which will easily show on inspection if below its proper level in the detector tube 11, and which will readily show its presence in the storage tank if a leak occurs in shell 1.

When the storage tank is in use, the detector fluid 12 will function in several ways. First, on inspection of the detector tube 11 by removing the usual plug or cap at its service box 13, if the detector fluid is below the required level, it will indicate at once that a leak exists in either the outer or the inner shell of the tank. Second, the presence of detector oil in the storage tank, which will show on a test rod inserted into gauge pipe 7 or in the stored fluid itself.

In the installation of fluid storage tanks underground as at present required, either in vaults or imbedded in concrete, moisture eventually causes corrosion, and when a leak occurs, especially where the tank is imbedded in concrete, the leak frequently continues for a long period before discovery. In such cases serious results may follow where the fluid, such as gasoline, seeps through the ground into buildings or other structures where explosions may occur. The jacketing of the storage tank and surrounding same with an oil overcomes this difficulty, and when the outer shell or jacket becomes corroded and leaks occur, the drop in the detector oil level will immediately give notice so that proper steps may be taken promptly to repair the leaks.

What I claim is:

1. A leak detector for an underground storage tank for fluids, comprising a readily observable fluid in combination with a tank having a double shell the walls of which are held in spaced relation, and which space is filled with said fluid, whereby leakage into the ground through the outer shell, or from the inner shell to the jacket space, or into the inner shell from the jacket space may be quickly observed, and a tube extending from the jacket to show the level of the indicator fluid.

2. A leak detector for an underground storage tank for gasoline, comprising a readily observable non-explosive fluid in combination with a tank having a double shell the walls of which are held in spaced relation, and which space is filled with said fluid, whereby leakage into the ground through the outer shell, or from the inner shell to the jacket space, or into the inner shell from the jacket space may be quickly observed, and a tube extending from the jacket to show the level of the indicator fluid.

3. A leak detector for an underground storage tank for gasoline, comprising a non-explosive fluid of distinctive color in combination with a tank having a double shell the walls of which are held in spaced relation, and which space is filled with said fluid, whereby leakage into the ground through the outer shell, or from the inner shell to the jacket space, or into the inner shell from the jacket space may be quickly observed, and a tube extending from the jacket to show the level of the indicator fluid.

4. A leak detector for an underground storage tank for gasoline, comprising an oil of such character as to be readily observable and in combination with a tank having a double shell the walls of which are held in spaced relation, and which space is filled with said fluid, whereby leakage into the ground through the outer shell, or from the inner shell to the jacket space, or into the inner shell from the jacket space may be quickly observed, and a tube extending from the jacket to show the level of the indicator fluid.

This specification signed at New York city, in the county and State of New York, this 14th day of January, 1931.

DIETRICH WORTMANN.